United States Patent Office.

JONAS DIEHL, OF EAST FREEDOM, PENNSYLVANIA.

Letters Patent No. 75,535, dated March 17, 1868.

---

IMPROVEMENT IN TANNING AND COLORING SHEEP-SKINS.

---

*The Schedule referred to in these Letters Patent and making part of the same.*

---

TO ALL WHOM IT MAY CONCERN:

Be it known that I, JONAS DIEHL, of East Freedom, in the county of Blair, and State of Pennsylvania, have invented a new and useful Improvement in Tanning and Coloring Leather; and I do hereby declare that the following is a full, clear, and exact description thereof, which will enable those skilled in the art to make and use the same.

This invention relates to a new and useful improvement in tanning and coloring leather, more especially sheep-skins, with the wool on, and which are used for mats and similar purposes.

The tanning-liquor I employ is composed of the following ingredients: A strong solution of stable-manure strained through a linen cloth, eight gallons; alum dissolved in one gallon of water, three pounds; to alum solution add common salt, one quart. The alum and salt are stirred until entirely dissolved, and are then poured into the stable-manure solution, and the whole strained through a piece of muslin cloth. To this mixture I add one gallon of chamber-lye, and then dissolve three-quarters ($\frac{3}{4}$) of an ounce of solferino crystal in three gallons of warm water, and add the latter to the former, the whole forming a combined tanning and coloring-liquid, which will tan and color six sheep-skins, with the wool on, in from three to five days, and at an average cost of about fifteen cents each.

I claim as new, and desire to secure by Letters Patent—

A tanning and coloring-liquor, composed of the ingredients and mixed in the proportions about as specified, for tanning and coloring sheep-skins, as set forth.

JONAS DIEHL.

Witnesses:
    F. P. MAYNARD,
    MARTIN LINGENFETTER.